US009268844B1

(12) United States Patent
Kadarkarai et al.

(10) Patent No.: US 9,268,844 B1
(45) Date of Patent: Feb. 23, 2016

(54) ADDING DOCUMENT FILTERS TO AN EXISTING CLUSTER HIERARCHY

(71) Applicant: Google Inc., Mountain View, CA (US)

(72) Inventors: Jayaprabhakar Kadarkarai, Hyderabad (IN); Shailesh Kumar, Hyderabad (IN)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 13/836,435

(22) Filed: Mar. 15, 2013

Related U.S. Application Data

(60) Provisional application No. 61/665,526, filed on Jun. 28, 2012.

(51) Int. Cl.
*G06F 17/30* (2006.01)

(52) U.S. Cl.
CPC ................. *G06F 17/30705* (2013.01)

(58) Field of Classification Search
CPC ................................ G06F 17/30705
See application file for complete search history.

(56) References Cited

U.S. PATENT DOCUMENTS 8,165,974 B2 * 4/2012 Privault et al. ................. 706/12
2003/0018652 A1 * 1/2003 Heckerman et al. ....... 707/104.1

OTHER PUBLICATIONS

Ding, C.; Xiaofeng He, "Cluster merging and splitting in hierarchical clustering algorithms," ICDM 2002.*

* cited by examiner

*Primary Examiner* — Haroon H Hasan
(74) *Attorney, Agent, or Firm* — Lerner, David, Littenberg, Krumholz & Mentlik, LLP

(57) ABSTRACT

In an automatic electronic discovery search tool, documents can be clustered into a cluster hierarchy using data contained in a first field of the documents. One of more levels of the cluster hierarchy are merged. Merged clusters are further clustered using data contained in a second field of the documents. The first field and second field may be determined by the signal-to-noise ratio of the data contained in the fields. Clusters may be filtered or used in a document review tool.

18 Claims, 10 Drawing Sheets

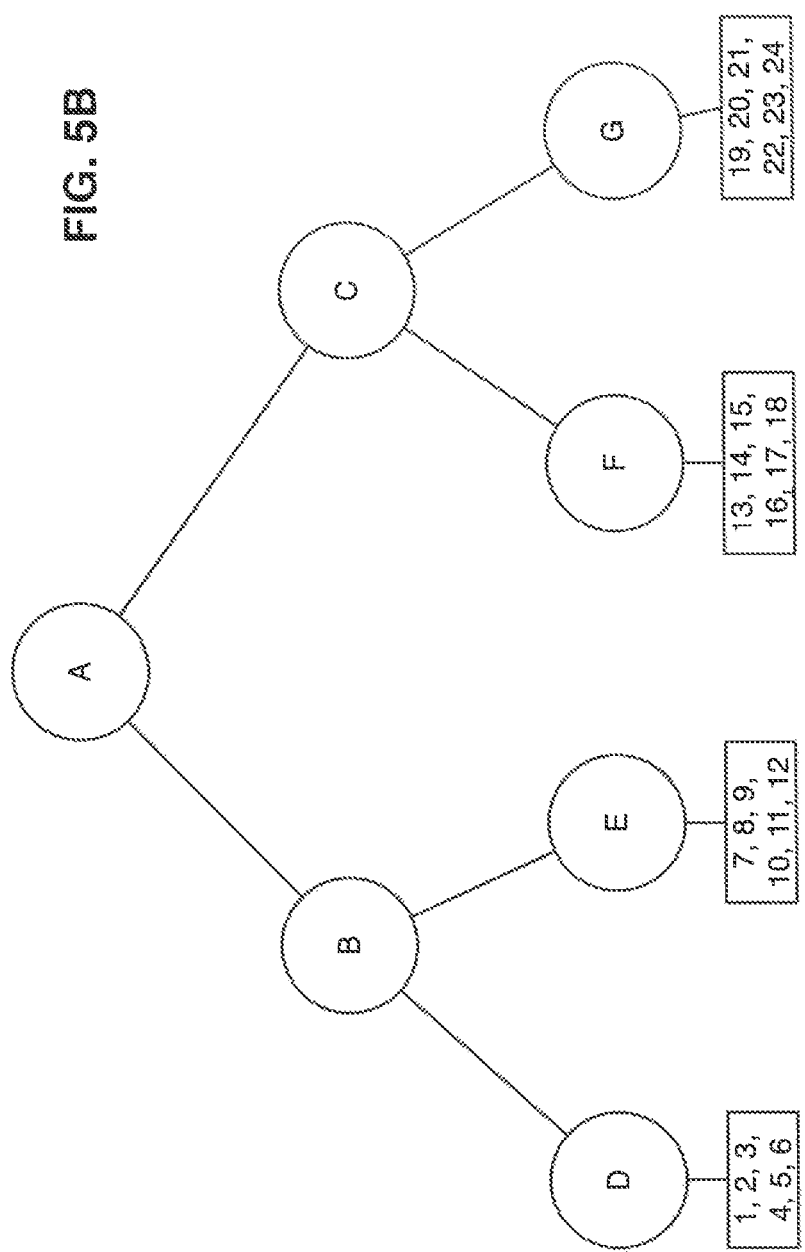

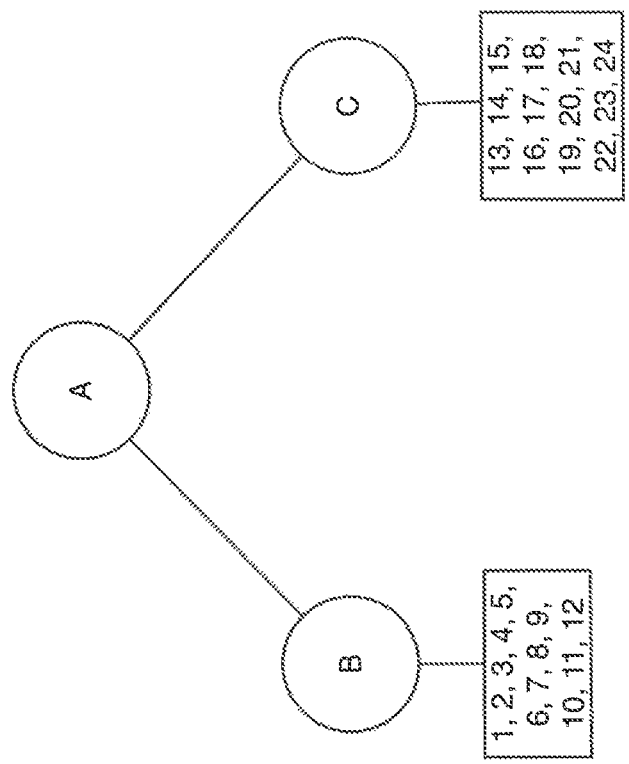

ADDING DOCUMENT FILTERS TO AN EXISTING CLUSTER HIERARCHY

CROSS-REFERENCE TO RELATED APPLICATIONS

This application claims the benefit of U.S. Provisional Appl. No. 61/665,526, filed Jun. 28, 2012, which is hereby incorporated by reference in its entirety.

BACKGROUND

Electronic discovery tools allow corporations and other companies to review documents to be used in litigations and other proceedings. As businesses rely on computers more and more, the amount of documents produced in a given litigation quickly grows in size. Managing large document repositories and effectively reviewing the documents poses many issues to law firms and their clients.

Grouping documents according to a common theme allows reviewers to become knowledgeable about the particular theme of the document they are reviewing, and allows for faster and more accurate review by preventing context switches. Additionally, grouping documents together allows for certain bulk operations, such as discarding of a large group of documents that are very likely to be not relevant to the litigation.

BRIEF SUMMARY

Embodiments of the present invention relate to clustering documents relevant to a subject. In one embodiment, a method of clustering a set of documents is disclosed. Documents are clustered into a cluster hierarchy, initially according to data contained in a first field or type of field of the documents. One or more levels of the cluster hierarchy are merged. The merged levels are then re-clustered on data contained in a second field or type of field of the documents.

Further embodiments, features, and advantages, as well as the structure and operation of the various embodiments are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 5B is an example execution of a method in accordance with an embodiment.

FIG. 5D is an example execution of a method in accordance with an embodiment.

DETAILED DESCRIPTION

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Electronic discovery tools are now used in the vast majority of modern litigations. Conventionally, a vendor will collect a set of electronic documents from a business facing a litigation or threat of litigation, and load the documents into a database for further analysis. Analysis may include sorting the documents, filtering them according to a query, or partitioning them to be reviewed by specific reviewers.

One useful analysis method is to group documents according to a certain theme or other criteria. Grouped documents can then be reviewed together, such that documents related to particular criteria are all reviewed at the same time. This eliminates the need for a reviewer to keep track of multiple concepts at once. Instead, a reviewer can focus on one concept for a grouped set of documents, and move on to another group related to another concept.

In a large business, a set of collected documents may number from thousands to millions of documents. These large sets of documents pose many issues. Database performance on large numbers of documents degrades quickly. Analysis on even a relatively small set of documents may take hours or even days for a relatively simple goal, such as determining a count of instances of a particular phrase.

In order to group a set of documents, clustering routines may be used to create clusters of related documents. Clustering routines utilize a measure of similarity between two or more documents and aim to group the most similar documents together into one or more clusters.

Clustering on text may start by analyzing text documents to determine word counts. Documents may be then clustered together based on the word count statistics. For example, three documents that frequently mention the term "patent" may be clustered together, while four documents that frequently mention the word "copyright" may be clustered together, separate from the "patent" set.

Figure 1:
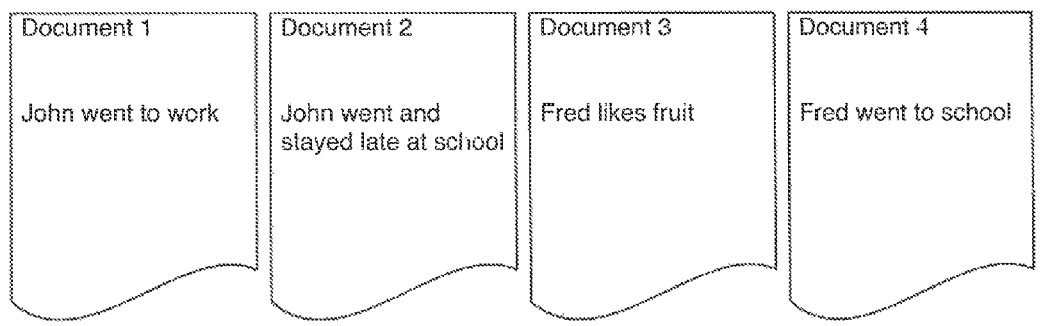
FIG. 1 is an illustration of a term-document incidence matrix.

Clustering documents depends on the similarity between two documents. In many clustering algorithms, statistics regarding word frequency and presence in a document are used to compare documents. Documents may be represented as vectors of the words contained in each document. A term-document incidence matrix may be created to represent each document in a matrix. For example, a matrix may represent each document as a column, and each word contained in all of the documents as a row. The matrix may omit common words such as "to" or "and", since these words may be present in many documents. The intersection of each document column and each word row contains a value indicating whether the particular word is contained in the document. This value is entered for each document contained in the set to be clustered. This matrix may be sparse, as the total number of words in the entire set of documents to be clustered may be much larger than the unique words in any particular document. In one embodiment, words may be weighted differently, based on their document frequency in the set of documents. For example, a rarer word may be weighted higher than a more common word. A portion of a term-document index is shown in FIG. 1 for four exemplary documents.

Once the term-document incidence matrix is created, each column may be considered as a vector representation of a particular document. In order to compare two documents and determine similarity between documents, a similarity calculation may be performed. Each document vector may be represented in a vector space model. To determine the similarity between two documents, a similarity measure, such as the cosine similarity, may be calculated. A cosine similarity function determines the cosine of the angle between two vectors, such as document vectors, and returns values between zero and 1. A value of zero indicates that the two documents are entirely dissimilar, while a value of 1 indicates that the two documents are identical.

Hierarchical clustering creates a representation of clusters in a tree form with a central node or root node, and branches that stem from the root. The central node may represent all data clustered into a single cluster. Branches represent sub-trees connected to the root and leaf nodes. A leaf may represent individual documents or a cluster, depending on the level of clustering applied. Sub-trees themselves may represent a hierarchy of clusters of documents. The two main methods of hierarchical clustering are known as top-down clustering and bottom-up clustering.

Bottom-up clustering may also be known as agglomerative clustering. In document clustering, agglomerative clustering routines start with the individual documents of the set to be clustered. Based on their similarities, two or more documents may be merged to create a cluster. A similarity calculation may return that two documents should be clustered together based on a list of common words. Other similarity calculations may be used as well that will be known to those skilled in the art. Two clusters may then be clustered together, again based on their similarity. Once all sub-clusters are clustered together, the agglomerative clustering routine is complete.

Figure 2:
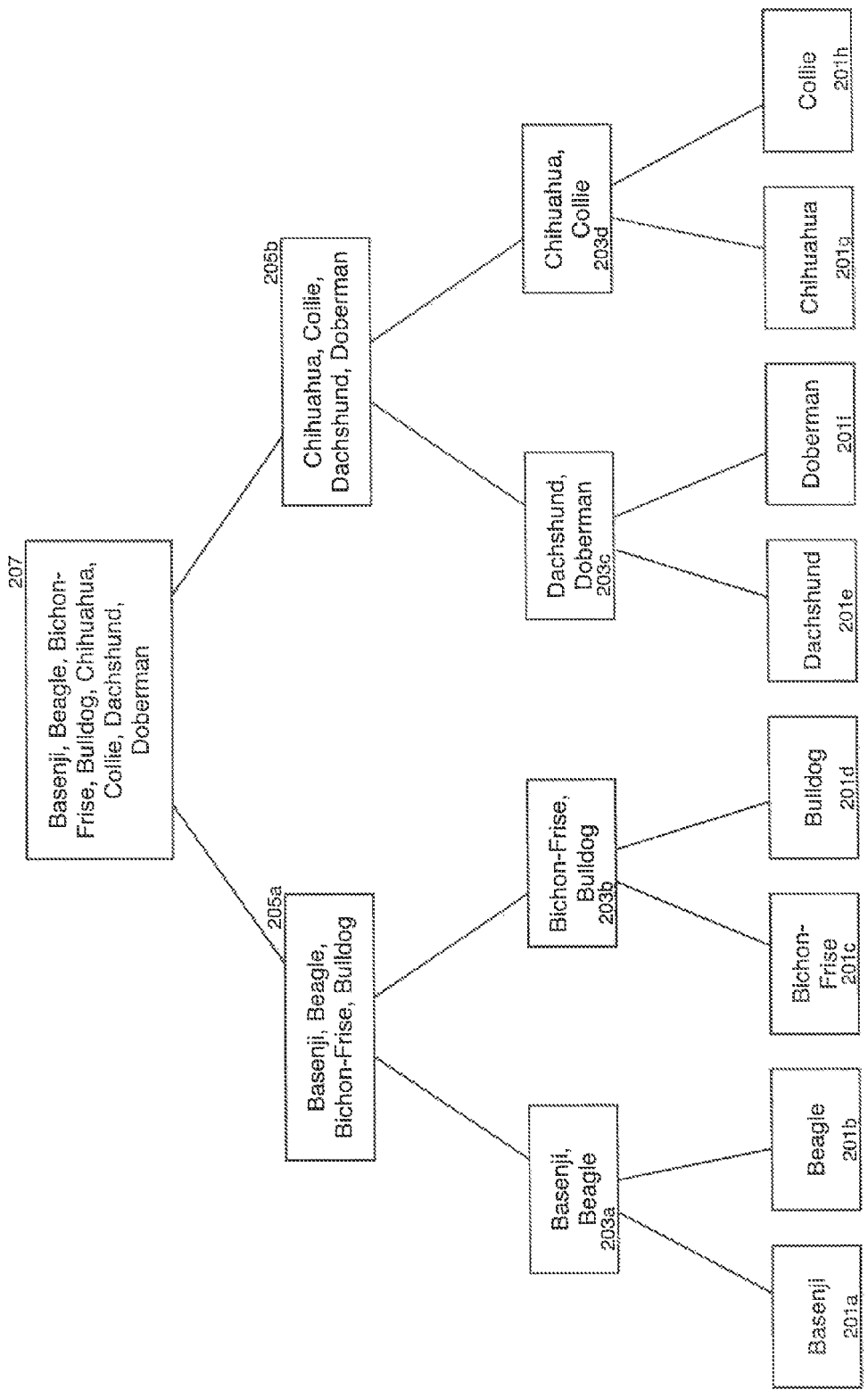
FIG. 2 is an illustration of a cluster hierarchy created as a result of an agglomerative clustering approach.

An example of an agglomerative clustering routine may be shown using the tree structure of FIG. 2. At the bottom level 201, eight words 201a-201h exist, each a particular dog breed. In this example, similarity is based on alphabetical ordering. Clusters are formed with the elements that are most similar to one another. Thus, based on their similarity to each other, the eight words may be clustered together into four clusters at level 203, forming sub-trees with nodes 203a-203d as the roots of the sub-trees. The four clusters are then clustered into two clusters, again based on similarity, at level 205, forming two further sub-trees with nodes 205a and 205b as the roots of the sub-trees. Finally, the two intermediate clusters are clustered together into one root cluster at level 207 to form the overall tree hierarchy.

An advantage of agglomerative clustering routines is that a number of clusters need not be specified before the clustering operation takes place. Further, a representation of an agglomerative clustering routine may be browsed, in that one can follow how a particular document is clustered throughout the hierarchy. In the example above, a user can follow word 201b through the hierarchy. If a particular cluster level exhibits undesirable results, for example, if two documents are clustered together that are not similar enough, the resulting hierarchy can be cut at that point such that the clusters are cohesive. Agglomerative routines are also considered superior to partitional clustering routines in terms of how cohesive related clusters are. Cohesiveness is measured as the average similarity between all pairs of elements of a particular cluster, and may use the cosine similarity calculation detailed above, or any other similarity calculation.

However, agglomerative clustering routines are slow in execution time, particularly with large sets of data. Agglomerative clustering routines, at their best, have a time complexity that is quadratic in relation to the number of documents to be clustered, and linear in relation to the average number of unique words per document or cluster.

Agglomerative clustering similarity measures include single-link and/or complete-link clustering. In single link clustering, the similarity between two clusters is computed as the similarity of the members of the two clusters that are the most similar to each other. Thus, to build a hierarchy, the distances between all elements are calculated. The elements that are closest to each other form a cluster of two elements for each singular element. At the next level, the similarity between two clusters of two elements is calculated, and the closest or most similar clusters are merged to create a new cluster. This process repeats until a specified stopping level (such as when a maximum number of documents per cluster is reached), or until all documents are clustered together in one cluster of all documents.

In complete-link clustering, the similarity between two clusters is computed as the similarity of the two clusters' most dissimilar elements. In other words, the two clusters or elements to be merged have the greatest distance between the two most dissimilar elements. As described in single link clustering, the distances between all elements are calculated. In complete link clustering, elements that are most dissimilar form a cluster of two elements, and this step repeats for each cluster until a hierarchy is formed.

Top-down clustering may also be known as divisive or partitional clustering. Top-down clustering starts with the entire set of data to be clustered, and a number of clusters to be created is specified. Based on the data in the set, clusters may be formed by partitioning the set at a particular point or points. The results of the partition may then be partitioned themselves, until the routine terminates when it has reached the previously specified number of clusters, or when further clustering is no longer possible due to a stopping criteria such as reaching a leaf node.

To partition one set into two or more clusters, partitional clustering often employs a clustering sub-routine. One such clustering sub-routine is known as k-means clustering. K-means clustering attempts to partition a set of observations or a set of data into k clusters, where each element of the set of data belongs to the cluster with the nearest mean or average. The mean is calculated as the center of the data points in the particular cluster.

In general, for k-means clustering, k initial means or points are selected from the set of documents. Initial means or points may be selected randomly, or selected using a heuristic. Clusters are created by associating documents most similar to the initially selected means into one cluster. After associating documents with the closest means, the center of each cluster is calculated. The center of each cluster is known as the centroid. Documents closest to each centroid are averaged again with the centroid to create updated cluster centroids. The process repeats, calculating new centroids each iteration, until a particular stopping condition occurs. The stopping condition may be that the centroids do not change from iteration to iteration, or that a certain number of iterations has occurred.

To create a partitional cluster hierarchy using k-means, k may be set to 2. Thus, two initial means or points are randomly selected from the data set. Clusters are created by associating each data point in the set with the nearest initial mean. Distance may be calculated using cosine similarity as described above or any other similarity measure. The centroid of each cluster is calculated. This centroid becomes the new mean around which to cluster the data points into two new clusters. Then, k clusters are created by again associating each data point in the set with the nearest initial mean. The step of calculating new means and associating data points with means are repeated until the stopping condition. This ensures that the selected mean and the clusters are optimal. To create the hierarchy, the k-means routine repeats recursively on each of the two clusters, with k set to 2 again, until a hierarchy is created. These divided clusters are connected to their initial clusters to form a hierarchy.

Figure 3:
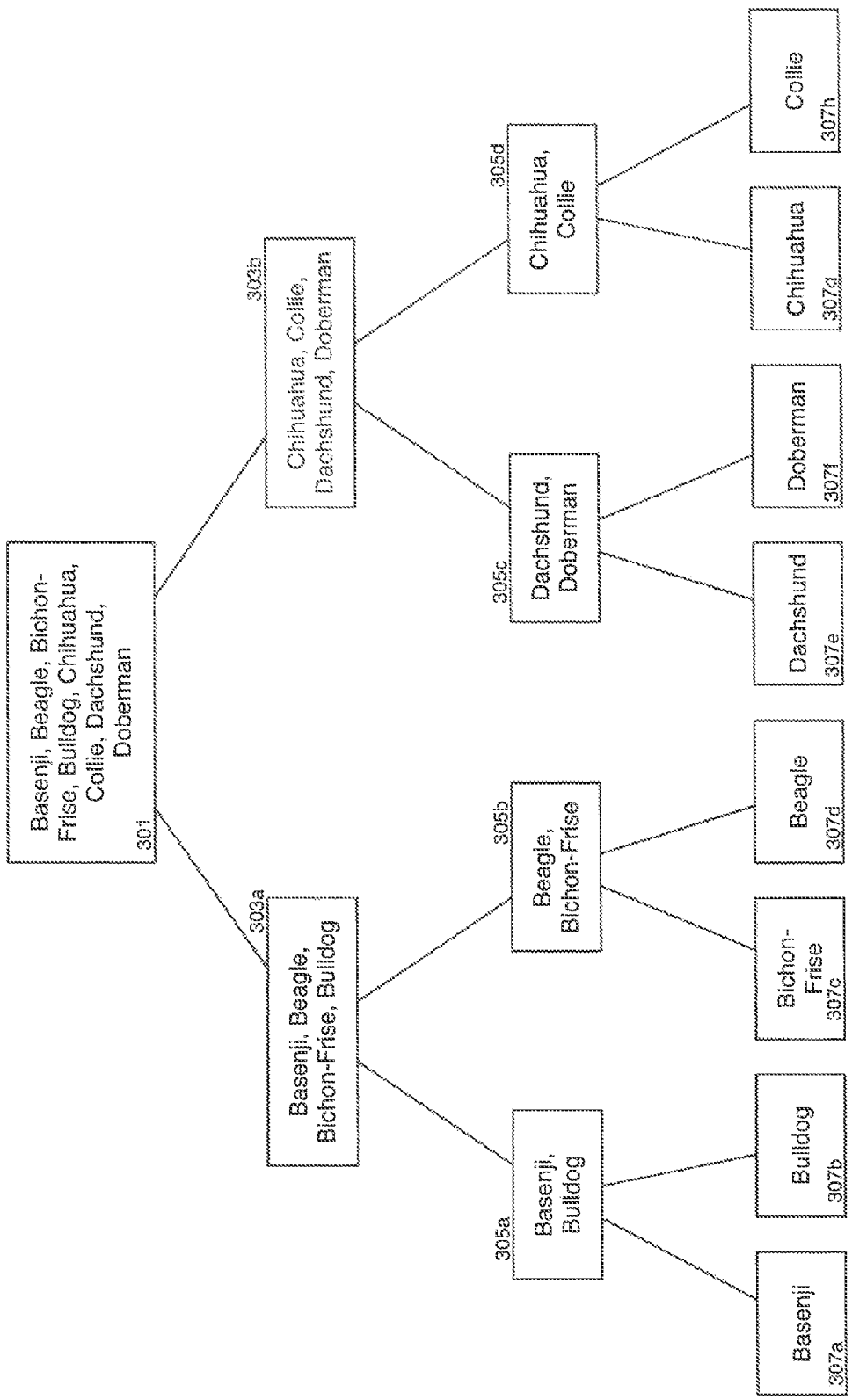
FIG. 3 is an illustration of a cluster hierarchy created as a result of a partitional clustering approach.

An example of a partitional clustering routine may be shown using the tree structure of FIG. 3. At the root 301 of the tree hierarchy, a set of eight documents is to be clustered. At each level 303, 305, and 307, k is chosen to be 2, which allows the set of documents to be partitioned and represented as a binary tree. The root of 8 documents is partitioned into two sets. Those two sets are each partitioned into two sets, forming sub-trees. This step is repeated until the routine terminates with each document representing a cluster. Although the document sets of FIG. 2 and FIG. 3 are identical, the different clustering routines may result in different created hierarchies. This can be seen at level 305, where the clusters of two documents each are slightly different than the clusters at level 203 of FIG. 2.

Partitional clustering routines have the advantage of being easier to implement than agglomerative clustering, and are generally faster in execution time than agglomerative clustering. K-means clustering, for example, has a time complexity that is linearly related to the number of documents to be clustered and the value chosen for k. However, partitional clustering routines may not provide results that are as accurate as agglomerative clustering routines. The results of a k-means clustering process often depend on good initial means being selected for each cluster. If the initial means is not optimal, clusters may not provide optimal results. As shown with respect to FIG. 3, clusters 307a and 307b may not be as cohesive as an agglomerative clustering routine's clusters.

As described above, both agglomerative and partitional clustering routines have their respective advantages and disadvantages. Partitional clustering routines are faster on large sets of data than agglomerative routines, while agglomerative routines may provide more accurate clustering results.

In terms of mathematical complexity, the best agglomerative clustering routines execute on the order of quadratic time in relation to the number of documents to be clustered. In computer science, using Big O notation, this is known as $O(n^2)$ time, where n is the number of documents in the set to be clustered. As an example, assuming an agglomerative clustering routine takes 1 micro-second per document to execute (0.000001 seconds), clustering 1 million documents using the best agglomerative clustering routines would take on the order of $10^6$ seconds, or over 10 days. In a document review environment, a set containing 1 million documents may be typical. Thus, agglomerative clustering routines may be too time-intensive on large document sets to be useful in a document review environment.

The fastest partitional clustering routines execute in linear time, such as k-means described above. Using Big O notation, this may be known as $O(kn)$ time, where n is the number of documents in the set to be clustered and k is the amount of clusters to create. Using similar figures, if a partitional clustering routine takes a tenth of a second per document to execute (0.1 seconds), and five clusters are created clustering 1 million documents using a partitional clustering routine would take slightly over five days to execute. Even with a far slower clustering routine, the partitional clustering routine takes half of the time that an agglomerative routine would for the same data.

E-mails and other documents used by electronic discovery systems include multiple distinct fields. For example, fields of an e-mail may include the sender of an e-mail, the recipient of an e-mail, the subject line of the e-mail, the body text of the e-mail, and any attachments to the e-mail. The sender and recipient(s) of the e-mail may be referred to as the collaborators of an e-mail.

Similarly, fields of an electronic document may include the users who created, edited, or viewed the document, also known as the collaborators of the document. Other fields may include the file name of the document, an identifiable title of the document, or the text content of the document. The overall similarity between two documents may therefore consider both content fields and collaborator fields associated with the document, to provide a complete assessment of the similarity between two documents.

Clustering a large number of documents may take a large amount of time. The amount of time taken for a clustering operation may be proportional to the number of documents, as well as the size of the fields to be clustered on. For example, the body text of an e-mail is orders of magnitude larger than other fields. These fields, however, provide more information for clustering than smaller fields. Smaller fields, conversely, result in faster clustering operations. Thus, combining the fast operation of clustering on fields with less information, while also clustering on fields with greater information, may create a balanced clustering solution.

Figure 4:
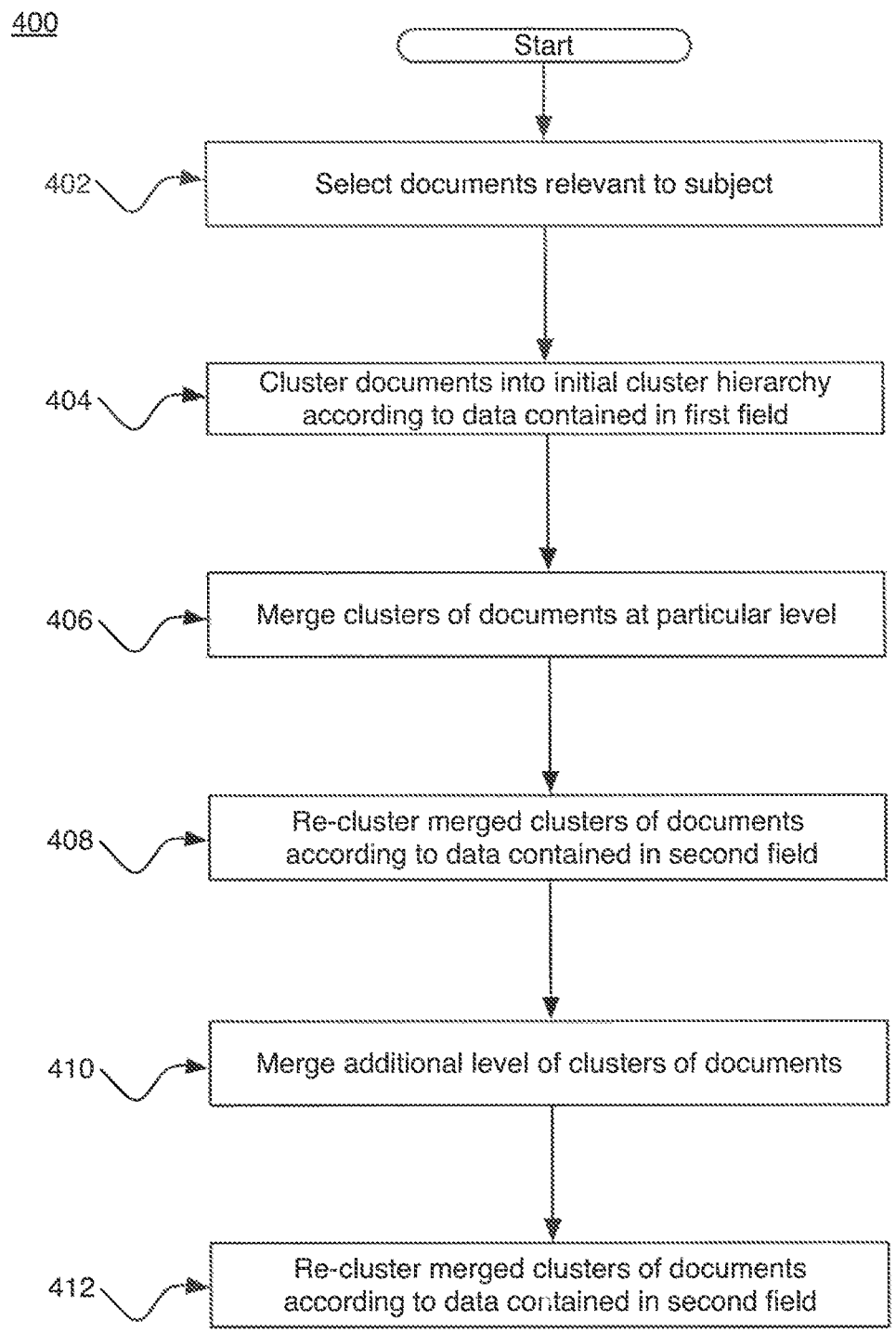
FIG. 4 is a flow diagram of a method for clustering documents in accordance with an embodiment.

Thus, in an embodiment, a number of levels or a number of sub-trees on a tree structure resulting from a clustering routine may be re-clustered in accordance with criteria different from the criteria used for the initial clustering. For example, a set of e-mails relevant to a subject may be clustered first on the collaborators of an e-mail, and re-clustered on the collaborators and the subject portion of the e-mail. FIG. 4 is an illustration of a method 400 for a method of clustering documents considered to be relevant to a subject.

At block 402, a set of documents to be clustered is selected. These documents have been previously determined to be responsive to a subject. The documents may be text documents, spreadsheets, electronic mail messages, presentations, or any other type of electronic document. The documents may be stored in a database, on a storage device, or on a plurality of storage devices.

At block 404, the set of documents are clustered into an initial cluster hierarchy according to data contained in a field present in the documents. The field may be a content field or a non-content field. Depending on the implementation of method 400, an agglomerative, bottom-up routine may be used, or a partitional, top-down routine may be used. The choice of clustering routine may also depend on the performance desired by the user of the clustering routine, on the number of documents to be clustered, or any other criteria specified.

At block 406, clusters or sub-trees at a particular level of the initial cluster hierarchy generated at block 404 are merged. For example, sub-trees at the bottom two levels of the cluster hierarchy, or any other number of levels of the cluster hierarchy, may be merged into a cluster at the next highest level. Thus, for example, sub-trees below a certain level may be merged into a parent node.

At block 408, each cluster of documents merged at block 406 are re-clustered into individual cluster hierarchies, according to data contained in a second field present in the documents. The second field may also be a content or non-content field, such as a collaborator field. Each cluster hierarchy may effectively replace portions of the initial cluster hierarchy with the newly clustered hierarchies. Again, depending on the implementation of method 400, an agglomerative, bottom-up routine may be used, or a partitional, top-down routine may be used.

At block 410, an additional level of the modified cluster hierarchy is merged. For example, if at block 406, the bottom two levels of the cluster hierarchy were merged into a single cluster, at block 410, the bottom three levels of the cluster hierarchy may be merged into a single cluster at the next highest level of the cluster hierarchy.

At block 412, the clusters of documents merged at block 410 are again clustered into individual cluster hierarchies according to data contained in the second field present in the documents. Again, depending on the implementation of method 400, an agglomerative, bottom-up routine may be used, or a partitional, top-down routine may be used.

In accordance with an embodiment, after block 412, additional levels of the cluster hierarchy are merged, and re-clustered according to data contained in the second field present in the documents, until the root of the hierarchy is reached. At this point, the cluster hierarchy is clustered on both the data contained in the first field present in the documents and on the second field present in the documents.

In accordance with a further embodiment, clustering may be performed on data contained in a third field present in the documents. Thus, for example, the first field clustered on may be collaborators of an e-mail or document, such as the sender and recipients of a document. The second field clustered on may be the subject of a document, such as the subject of an e-mail. The third field clustered on may be the full body text of a document. The cluster hierarchy may be re-clustered on additional fields as well.

Method 400 may be further explained with reference to the examples of FIGS. 5A-5E. In accordance with block 402 of method 400, a set of documents having 24 documents may be selected for clustering. The set of documents may be clustered into an initial cluster hierarchy according to data contained in a first field present in the documents. The resulting initial cluster hierarchy may be represented by the cluster hierarchy of FIG. 5A, which has four levels of clusters.

In accordance with block 406, clusters in the bottom level of the initial cluster hierarchy may be merged. Accordingly, clusters H and I may be merged into their parent cluster, D. Other clusters at the bottom level are similarly merged. The resulting cluster hierarchy may be represented by the cluster hierarchy of FIG. 5B, which has three levels of clusters, as clusters at the bottom level have been merged.

Figure 5A:
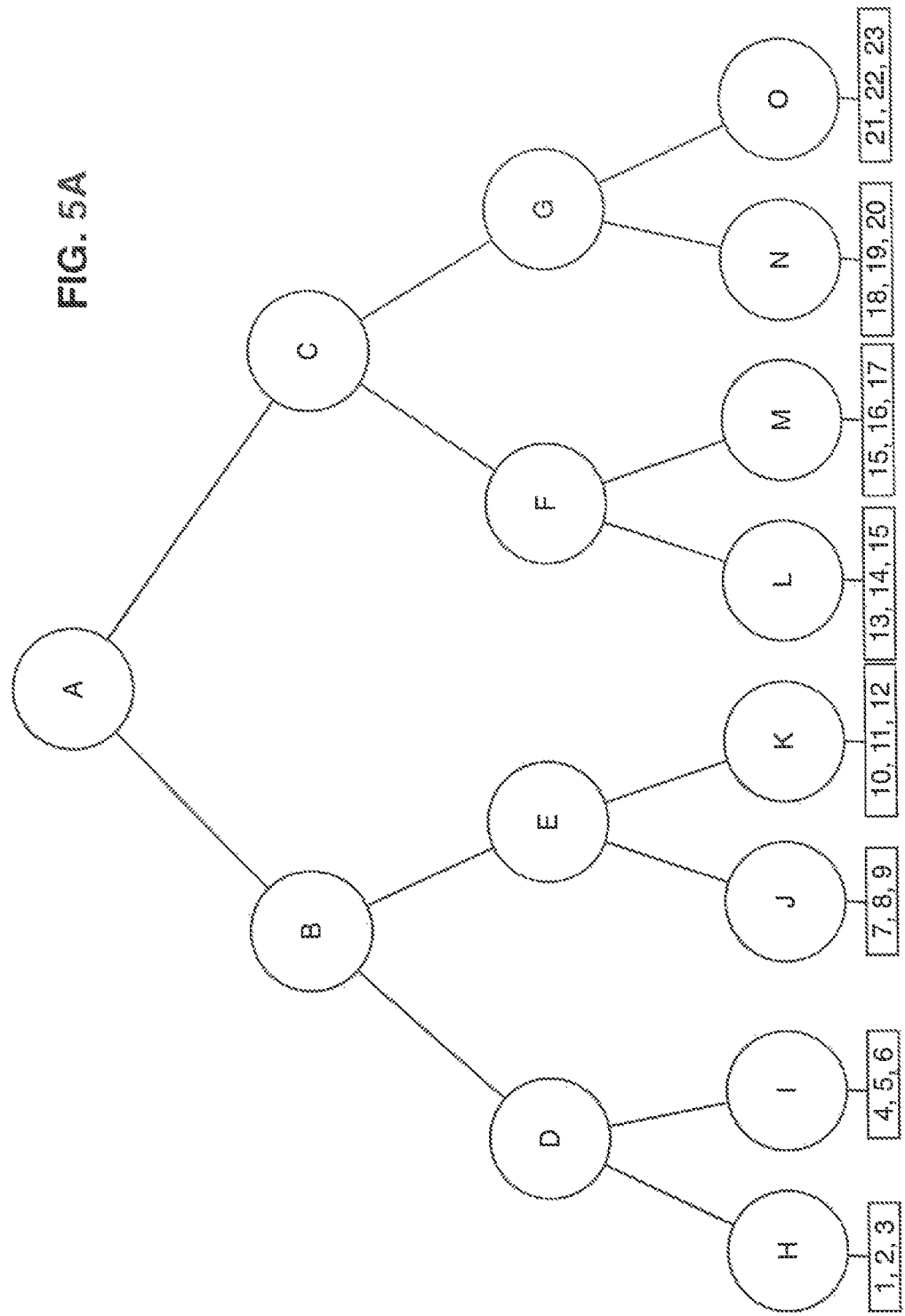
FIG. 5A is an example execution of a method in accordance with an embodiment.

In accordance with block 408, each merged cluster of documents, represented by nodes D, E, F, and G in FIG. 5B, may be re-clustered on data contained in a second field of the documents. The resulting cluster hierarchy may be represented by FIG. 5C. Although FIG. 5C is similar to the initial cluster hierarchy of FIG. 5A, the resulting clusters may be different, as additional data was used to generate the cluster hierarchy of FIG. 5C.

Figure 5C:
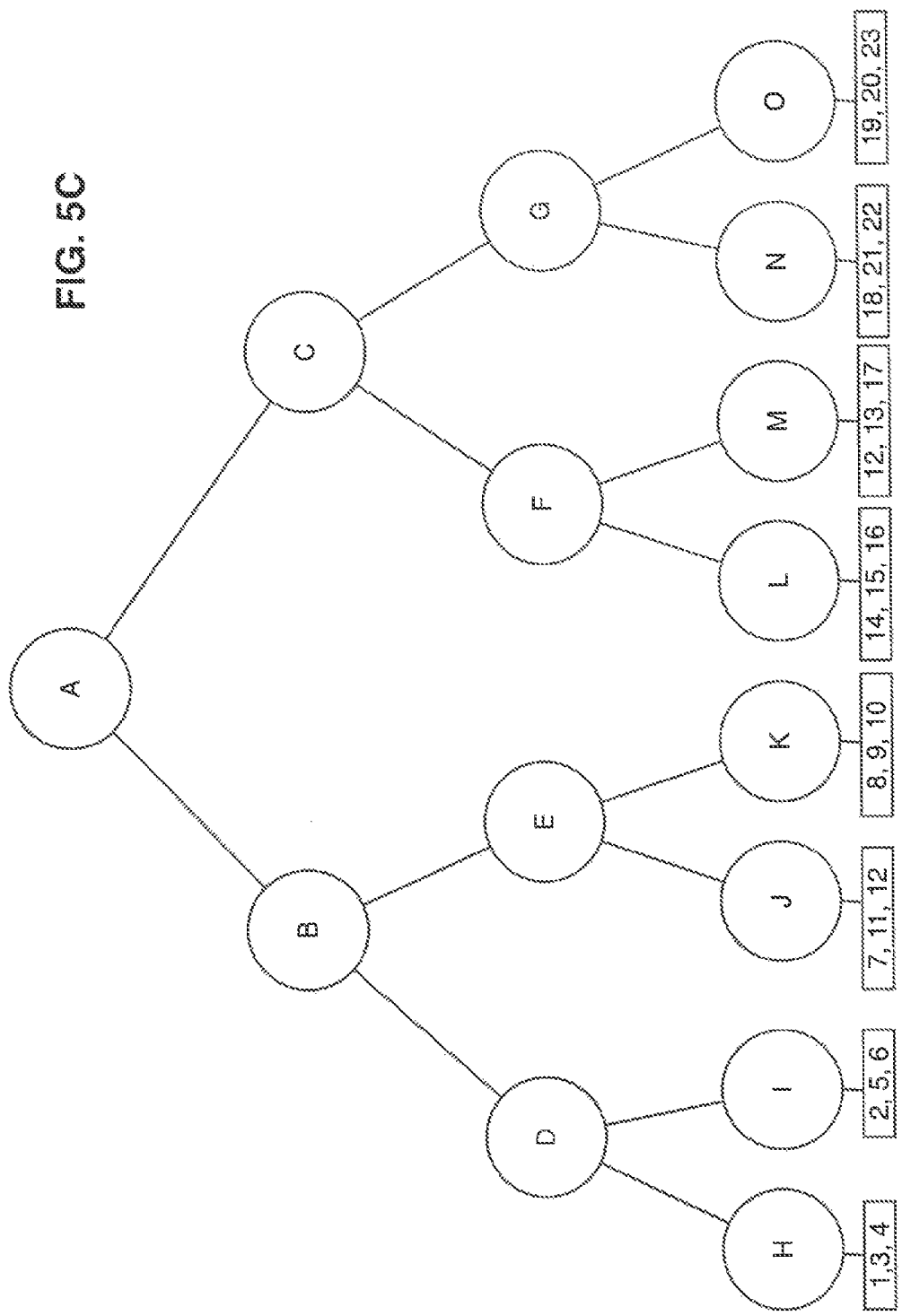
FIG. 5C is an example execution of a method in accordance with an embodiment.
Figure 5E:
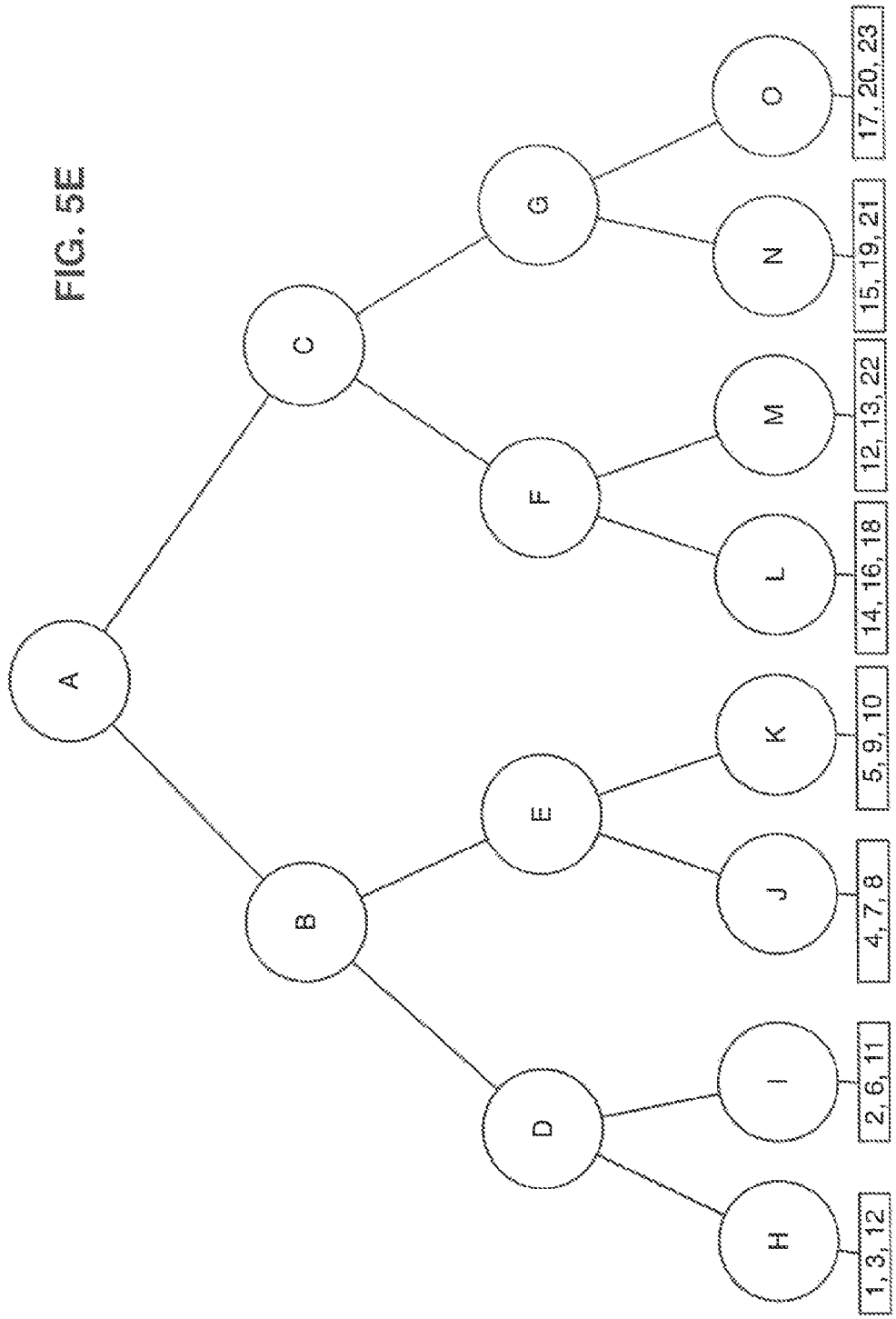
FIG. 5E is an example execution of a method in accordance with an embodiment.

In accordance with block 410, a further level of the modified cluster hierarchy of FIG. 5C may be merged into clusters. In this example, the bottom level was initially selected for merging. Thus, in accordance with block 410 of method 400, the bottom two levels may be selected for merging. The resulting cluster hierarchy may be represented by FIG. 5D, which has two levels of clusters, as two levels have been merged.

In accordance with block 412 then, the resulting merged clusters are clustered into a new hierarchy according to the data contained in the second field of the documents. The resulting cluster hierarchy may be represented by FIG. 5E, where the clusters have a different distribution of documents than the initial cluster hierarchy of FIG. 5A and FIG. 5C.

In one embodiment, prior to clustering, the content of the fields of the documents may be sorted to determine which fields to cluster on in which order. For example, fields may be sorted by their signal-to-noise ratio. Fields with a high signal-to-noise ratio may be used for clustering first, while fields with a lower signal-to-noise ratio may be used for clustering later in the process. Fields that may be used in some embodiments may include collaborators of a document, the subject of a document, snippets of text or context around text which identified a document as responsive to a query, the entire text of the body of a document, and the content of a document including any attachments.

In one embodiment, the similarity measure used to determine the similarity between two documents may differ between the various fields of the documents. For example, when clustering on fields containing content, a cosine similarity measure may be used to determine how similar two documents are. In one embodiment, different content fields may be weighted differently. For example, the subject field of an e-mail may be weighed higher than the body field of an e-mail. In a further embodiment, when clustering on a field such as collaborators of an e-mail, the Jaccard coefficient between two sets of collaborators may be used to determine how similar the documents are. Different collaborator fields may also be weighed differently. For example, the "to:" field of an e-mail may be weighed higher than a "cc:" field of an e-mail.

In one embodiment, if two or more fields have a similar signal-to-noise ratio, both fields may be used for clustering or re-clustering. For example, an initial hierarchy may be generated based on the collaborators of documents, based on a high signal-to-noise ratio, in accordance with block 404. If the subject and body fields of documents have similar signal-to-noise ratios, after a number of levels have been merged in accordance with block 406, the clustering operation at block 408 may cluster the merged clusters on data contained in both subject and body fields.

In one embodiment, method 400 may stop after a certain number of levels have been merged and re-clustered before the root of the hierarchy is reached. For example, a particular cluster hierarchy may have 8 levels after the initial clustering operation in accordance with block 404. A particular user may not wish to have the entire 8 levels re-clustered, and instead may wish to have the re-clustering operation stop at the third or other level of the cluster hierarchy.

In one embodiment, re-clustering may only be performed for data contained in fields with a signal-to-noise ratio that satisfies a particular threshold. Clustering on fields with a low signal-to-noise ratio may not be time effective. Thus, for example, if data contained in attachments to a document exhibits a low signal-to-noise ratio, that field may not be selected for clustering.

In one embodiment, initial clustering on a field with a high signal-to-noise ratio may be performed quickly. Accordingly, a user may be able to view high level information based on the initial cluster hierarchy, such as a number of clusters that are created. The user may also be able to identify patterns based on the initial cluster hierarchy.

In some implementations, the initial cluster hierarchy may be generated in a matter of minutes. Further clustering on additional fields may take a number of hours. Thus, the initial clustering results may be analyzed by a user to determine whether further clustering is necessary for the user's purposes.

Documents may be clustered first on a non-content field, as described with respect to application U.S. patent application Ser. No. 13/530,262, filed Jun. 22, 2012, titled Clustering E-mails Using Collaborative Information, incorporated herein by reference in its entirety. As mentioned in application U.S. patent application Ser. No. 13/530,262, clustering documents such as electronic mail on data contained in a non-content field may be faster than clustering on data contained in content fields. After an initial clustering on a non-content field, clusters may be formed that indicate one or more themes common to a cluster. Therefore, in accordance with block 406 and 408, certain levels of the cluster hierarchy may be further clustered on content information to create clusters for each theme.

In an embodiment, a maximum tree depth level may be received for the clustering operation. Tree depth may be measured using the number of steps or connections from the root of the hierarchy to the leaf nodes. For example, a user may desire that the hierarchy generated by the first clustering operation terminate after twelve levels. Additionally, a maximum tree depth level for the second clustering operation may be received.

In an embodiment, documents to be clustered may not be located in a single database. Instead, documents may be distributed across a plurality of clients, such as in a hosted user environment utilizing distributed storage. Thus, in an embodiment, clustering may be performed on a set of documents distributed across a plurality of client devices.

Once the hierarchy is clustered and re-clustered according to various embodiments described herein, the resulting clusters may be filtered in accordance with specified filter criteria. For example, a cluster may represent a group of e-mails responsive to a particular subject or relevant to a particular query. The cluster can then be further filtered according to desired criteria to present a smaller set of responsive documents for review or other purposes.

The clustering approaches described herein can be implemented in software, firmware, hardware, or any combination thereof. The cluster approaches may be implemented to run on any type of processing device including, but not limited to, a computer, workstation, distributed computing system, embedded system, stand-alone electronic device, networked device, mobile device, set-top box, television, or other type of processor or computer system.

As detailed above, partitional clustering and agglomerative clustering each have their advantages and disadvantages. Thus, in an embodiment, the initial clustering may be performed according to a partitional clustering approach. Sub-trees to be re-clustered may be identified, and these sub-trees may be re-clustered according to an agglomerative approach. Such an embodiment may provide superior results in terms of execution time.

If execution time is a priority, both the initial clustering and the re-clustering portion may be done according to a partitional clustering approach. If superior results is the priority, and execution time is less important, an agglomerative approach may be used for either the initial clustering or the re-clustering portion of the routine, or both portions.

In an embodiment, a re-clustered sub-tree or sub-trees may be exported to a document review tool. Such a tool may allow a reviewer, such as a member of a company's legal department, to view a highly cohesive cluster of documents and perform further analysis, such as tagging documents as responsive to a particular document request or criteria.

In an embodiment, a re-clustered sub-tree or sub-trees may be assigned to a particular reviewer in accordance with an access control policy. For example, if a sub-tree contains a document marked as attorney's eyes only, that sub-tree may automatically be assigned to an attorney in the legal department as opposed to a paralegal. As another example, if a sub-tree contains a large number of technical documents, the sub-tree may be assigned to a reviewer with technical expertise.

In an embodiment, a maximum or minimum number of documents per cluster may be specified. Thus, when either the first or the second clustering operation occurs, if a maximum number of documents is specified, the clustering operation continues until created clusters are under the maximum number. Similarly, if a minimum number of documents is specified, the clustering operation may cease once a particular cluster falls below that minimum number.

In an embodiment, the clusters of documents that result after the initial and subsequent re-clustering of documents may be exported to a document review tool. Thus, documents may be grouped for easier review, so that reviewers may be able to focus on one discrete issue at a time. Additionally, documents relating to a particular topic may be clustered together, and exported to a particular reviewer with previous experience with the topic.

Figure 6:
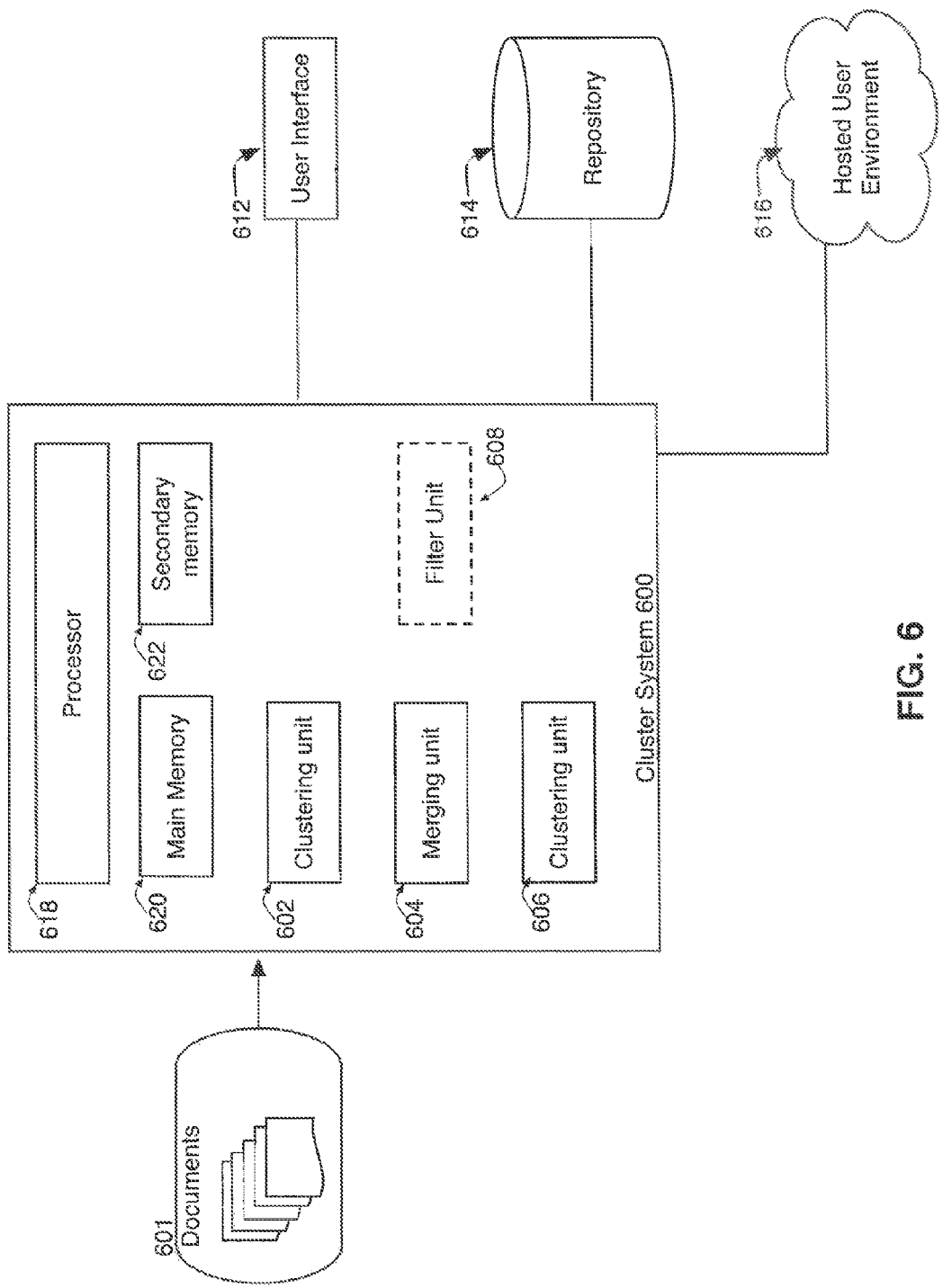
FIG. 6 is an illustration of a system in accordance with an embodiment.

FIG. 6 is an illustration of a cluster system 600 used to implement embodiments described herein. Documents 601 relevant or responsive to a subject may be provided to cluster system 600. Documents 601 may be provided from a database or other repository implemented in hardware, software, firmware, or a combination thereof.

Cluster system 600 contains a clustering unit 602. Clustering unit 602 may be configured to be a partitional clustering unit, and may utilize a k-means clustering routine or another partitional clustering routine to create a cluster hierarchy as described with respect to block 404 of method 400. Clustering unit 602 may also be configured to be an agglomerative clustering unit, and may use single-link, complete-link, or other agglomerative clustering techniques to generate a cluster hierarchy.

Cluster system 600 also contains a merging unit 604, which selectively merges one or more levels created by clustering unit 602. Merging unit 604 may be adapted to merge levels according to previously specified criteria. Alternatively, merging unit 604 may take input from user interface 610 to control the number of levels to be merged.

Cluster system 600 also contains a second clustering unit 606. Clustering unit 606 may be configured to be either a partitional or agglomerative clustering unit, and may re-cluster branches merged by merging unit 604.

Cluster system 600 may also contain a filter unit 608. Filter unit 608 may take clusters from agglomerative clustering unit 606 and filter data in accordance with an embodiment. For example, filter unit 608 may output documents that satisfy particular criteria.

Cluster system 600 may be connected to a user interface 612. User interface 612 may allow a user to specify to clustering unit 602, configured as a partitional clustering unit, a number of levels to be included in the generated cluster hierarchy. Additionally, user interface 612 may allow a user to control the operation of merging unit 604. Further, user interface 612 may allow a user to specify filter criteria to filter unit 608.

Document cluster system 600 may further be connected to a repository 614 to store the results of the cluster unit 600. Repository 614 may be used to store documents for a document review system. Document cluster system 600 may also be connected to a hosted user environment 616, as described below.

Document cluster system 600 may include one or more processors 618.

Document cluster system 600 may also include a main memory 620, such as random access memory (RAM), and may also include a secondary memory 622. Secondary memory 622 may include a hard disk drive and/or a removable storage drive for allowing computer programs or other instructions to be executed by processor 618.

In an embodiment, documents to be clustered are distributed across a plurality of clients in a hosted user environment. In a hosted user environment, utilizing a distributed file system, documents are not stored on a central server or on individual user devices. Instead, documents are distributed over multiple storage machines connected to a network. In this embodiment, a system such as the system described in FIG. 6 may be connected to the network of the hosted user environment to enable clustering and further analysis of documents in a hosted user environment.

Various aspects of the present invention can be implemented by software, firmware, hardware, or a combination thereof. Embodiments may be implemented in hardware, software, firmware, or a combination thereof. Embodiments may be implemented via a set of programs running in parallel on multiple machines. In an embodiment, different stages of the described methods may be partitioned according to, for example, the number of documents to be clustered, and distributed on the set of available machines.

The summary and abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but rather is defined by the following claims and their equivalents.

What is claimed is:

1. A method of filtering documents considered to be relevant to a subject, comprising:
   selecting a set of documents considered to be relevant to a subject, wherein each document is an electronic document that comprise two or more distinct fields including at least a first field and a second field, each of the two or more distinct fields providing data corresponding to a category of data about the respective document;
   clustering documents in the set of documents into a cluster hierarchy according to data contained in the first field, the cluster hierarchy comprising a plurality of branches, each branch having a sub-tree;
   merging a received number of levels of the cluster hierarchy; and
   re-clustering the merged levels according to data contained in the second field.

2. The method of claim 1, further comprising:
   merging an additional level of the cluster hierarchy; and
   re-clustering the merged levels according to data contained in the second field.

3. The method of claim 1, wherein the first field is a non-content field associated with each document in the set of documents and the second field is a content field associated with each document in the set of documents, wherein the content field comprises body text of the document and the non-content field comprises a field other than body text of the document.

4. The method of claim 1, further comprising exporting one or more clusters to a repository or a document review tool.

5. The method of claim 1, further comprising receiving a maximum tree depth level; and clustering, by a processing device, documents in the set of documents into a hierarchy according to data contained in a first field to the received maximum tree depth level.

6. The method of claim 1, wherein the step of clustering according to data contained in a first field is performed according to a partitional approach or agglomerative approach.

7. The method of claim 1, wherein the set of documents is distributed across a plurality of client devices in a hosted user environment.

8. The method of claim 1, further comprising receiving a maximum number of documents per cluster; and re-clustering the merged levels according to data contained in a second field, wherein each resulting cluster contains fewer than the received maximum number of documents.

9. A system of clustering a set of documents considered to be relevant to a subject, comprising:
   one or more processors; and
   a storage device having instructions stored thereon that, when executed by the one or more processors, cause the one or more processors to:
      select a set of documents considered to be relevant to a subject, wherein each document is an electronic document that comprises two or more distinct fields including at least a first field and a second field, each of the two or more distinct fields providing data corresponding to a category of data about the respective document;
      cluster documents in the set of documents into a cluster hierarchy according to data contained in the first field, the cluster hierarchy comprising a plurality of branches, each branch having a sub-tree;
merge a received number of levels of the cluster hierarchy; and
re-cluster the merged levels according to data contained in the second field.

10. The system of claim 9, the storage device having further instructions stored thereon that, when executed by the one or more processors, cause the one or more processors to:
merge an additional level of the cluster hierarchy; and
re-cluster the merged levels according to data contained in the second field.

11. The system of claim 9, wherein the first field is a non-content field associated with each document in the set of documents and the second field is a content field associated with each document in the set of documents, wherein the content field comprises body text of the document and the non-content field comprises a field other than body text of the document.

12. The system of claim 9, the storage device having further instructions stored thereon that, when executed by the one or more processors, cause the one or more processors to export one or more clusters to a repository or a document review tool.

13. The system of claim 9, the storage device having further instructions stored thereon that, when executed by the one or more processors, cause the one or more processors to:
receive a maximum tree depth level; and
cluster documents in the set of documents into a hierarchy according to data contained in a first field to the received maximum tree depth level.

14. The system of claim 9, wherein the step of clustering according to data contained in a first field is performed according to a partitional approach or agglomerative approach.

15. The system of claim 9, wherein the set of documents is distributed across a plurality of client devices in a hosted user environment.

16. The system of claim 9, the storage device having further instructions stored thereon that, when executed by the one or more processors, cause the one or more processors to:
receive a maximum number of documents per cluster; and
re-cluster the merged levels according to data contained in a second field, wherein each resulting cluster contains fewer than the received maximum number of documents.

17. The method of claim 1, wherein at least one of the documents is an e-mail and the first field and the second field each comprise one of: a sender, a recipient, a subject line, body text, and an attachment.

18. The method of claim 1, wherein at least one of the documents is not an e-mail, and the first field or the second field includes one of: a collaborator field indicating a user who created, edited, or viewed the document, or a title of the document.

* * * * *